Figure 1:
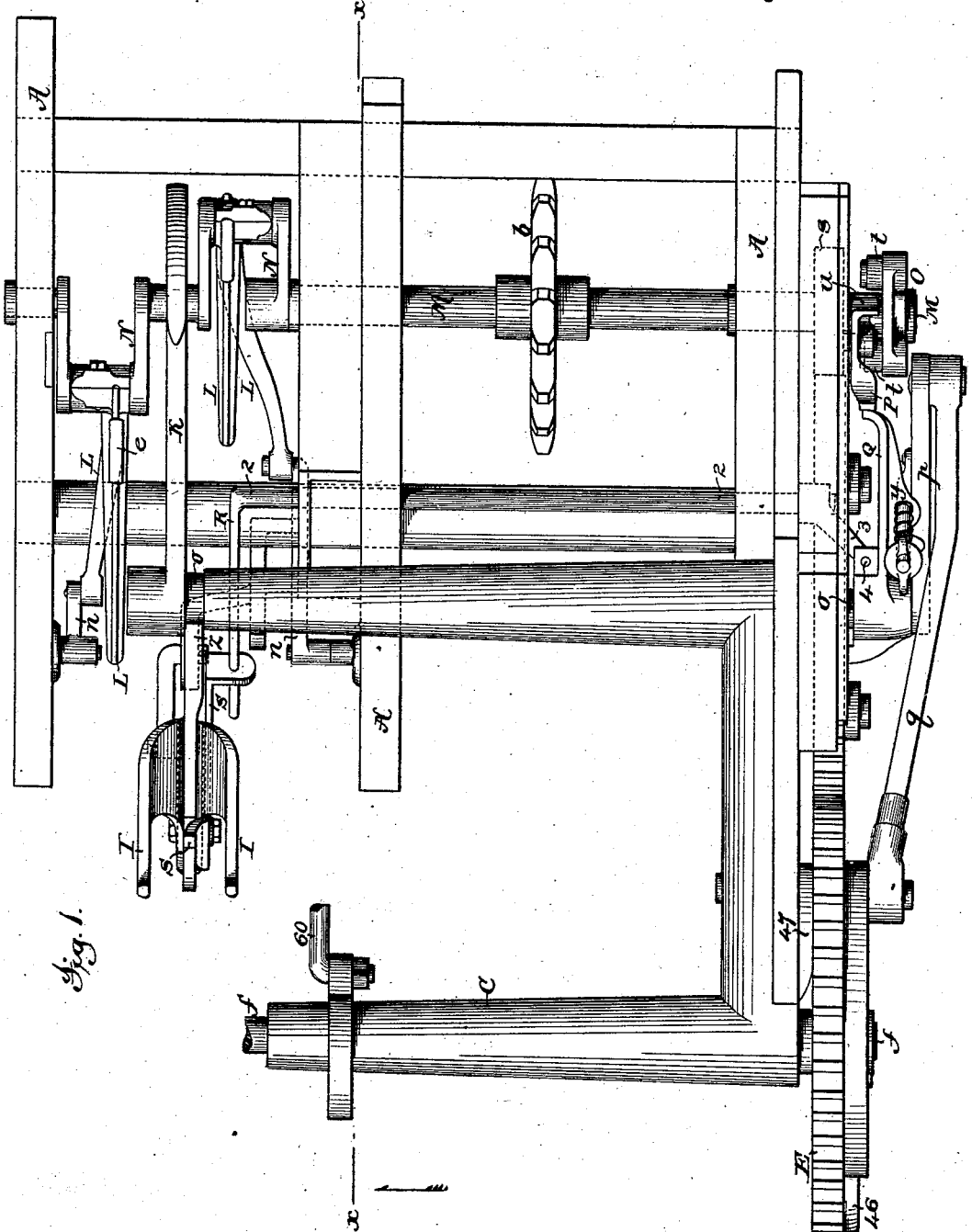

(No Model.)

J. F. APPLEBY.
GRAIN BINDER.

No. 260,634. Patented July 4, 1882.

Attest;
Geo. L. Graham
H. Janvier

Inventor,
Jno. F. Appleby
By
J. N. McIntire
Att'y.

(No Model.)

J. F. APPLEBY.
GRAIN BINDER.

No. 260,634. Patented July 4, 1882.

Attest;
Geo. H. Graham
H. Janvier

Inventor,
Jas. F. Appleby
By
J. N. McIntire
Att'y.

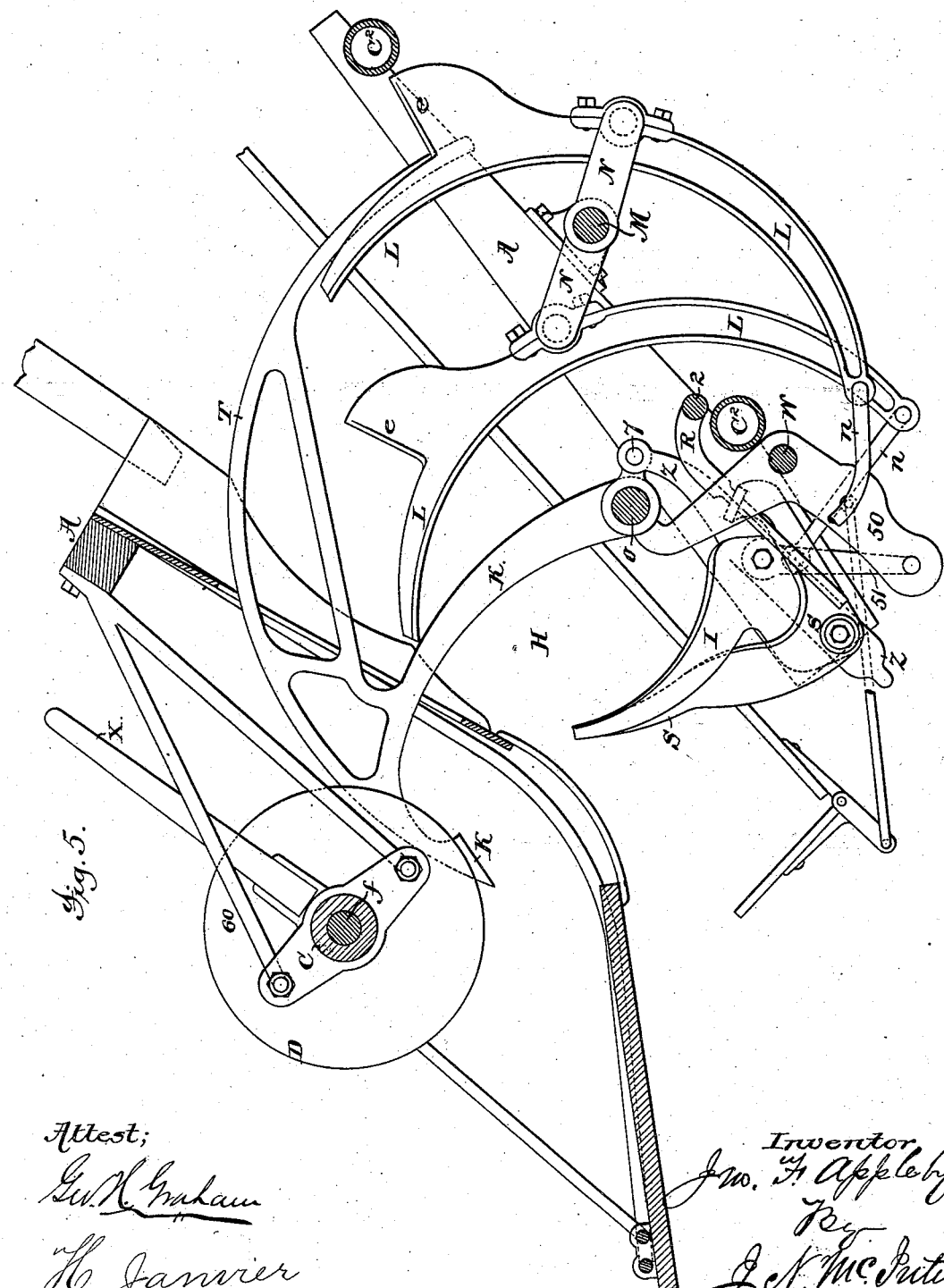

UNITED STATES PATENT OFFICE.

JOHN F. APPLEBY, OF MINNEAPOLIS, MINNESOTA, ASSIGNOR TO THE MINNEAPOLIS HARVESTER WORKS, OF MINNESOTA.

GRAIN-BINDER.

SPECIFICATION forming part of Letters Patent No. 260,634, dated July 4, 1882.

Application filed July 1, 1881. (No model.)

*To all whom it may concern:*

Be it known that I, JOHN F. APPLEBY, of Minneapolis, in the county of Hennepin and State of Minnesota, have invented certain new and useful Improvements in Grain-Binding Harvesters; and I do hereby declare that the following is a full and exact description thereof, reference being had to the accompanying drawings, making part of this application.

The general organization of the apparatus or contrivance made the subject-matter of this application being somewhat similar to that of the self-binder shown and described in the United States Letters Patent granted to me February 18, 1879, and numbered 212,420, I herein make reference merely to said patent for an understanding of such portions of the construction and so much of the operations of my present machine as are substantially similar to those of said patented machine, directing the descriptive part of this specification more particularly to explanations of the novel features of my present improved machine as compared with the machine shown in said patent.

To enable those skilled in the art to make and use a machine embodying my present invention, I will now proceed to more fully explain it, referring by letters to the accompanying drawings, and alluding in general terms to my said patent for the purpose of more intelligibly pointing out wherein lie the several features of improvement which form the subject of this application. To do this in the most comprehensive manner, I have generally lettered those parts which are common to the machine shown in the drawings of this case and that shown in my said patent with the same letters.

Figure 2:
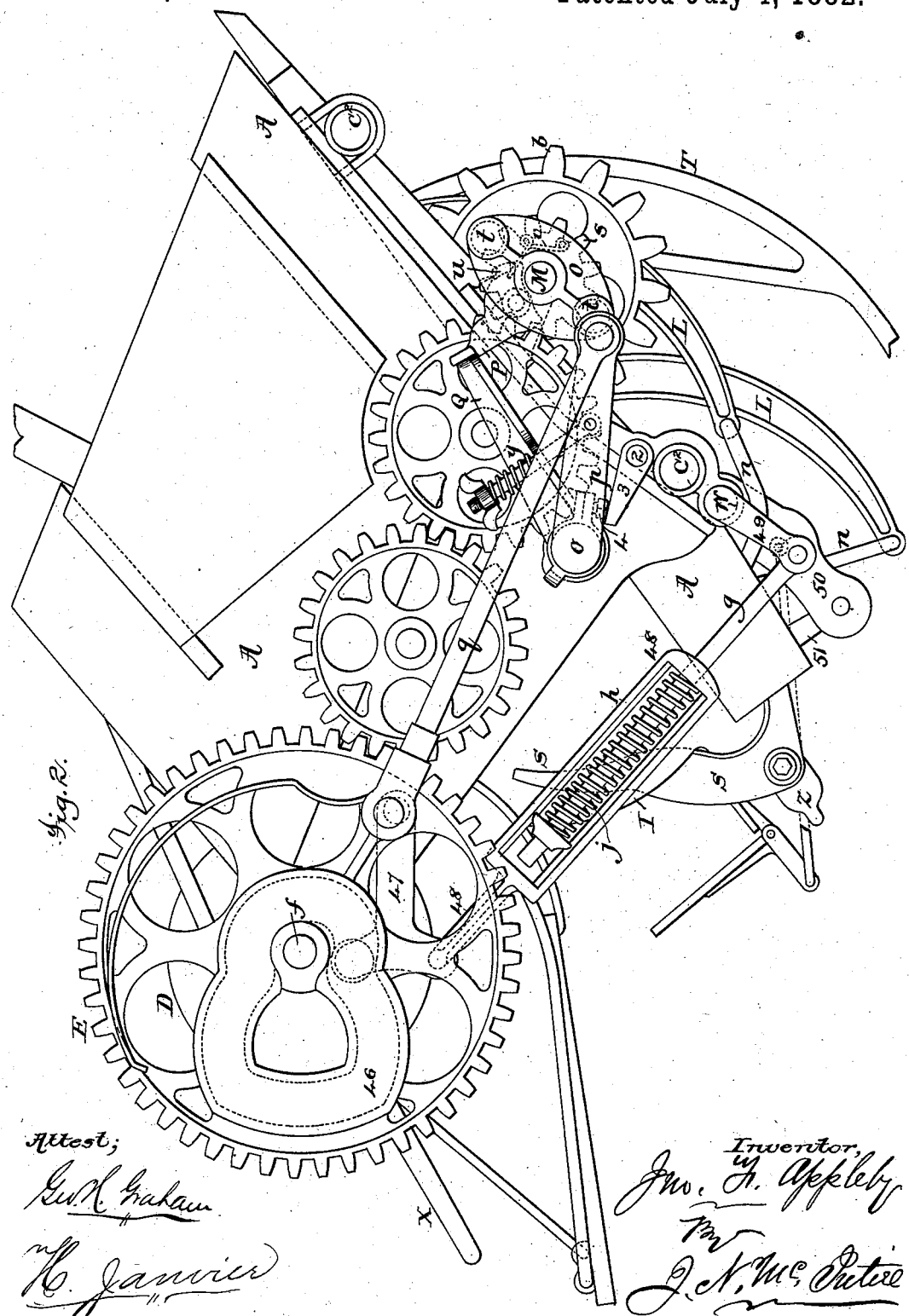
Figure 3:
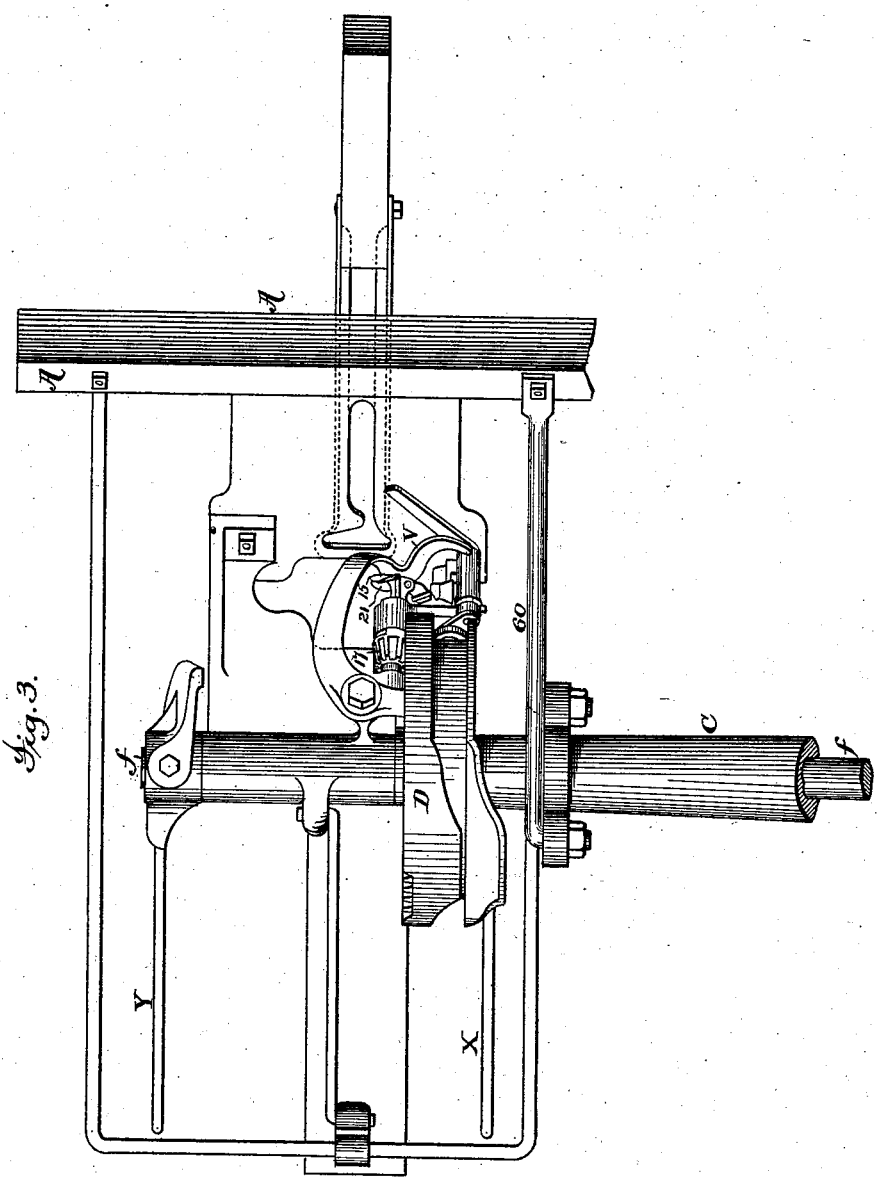
Figure 4:
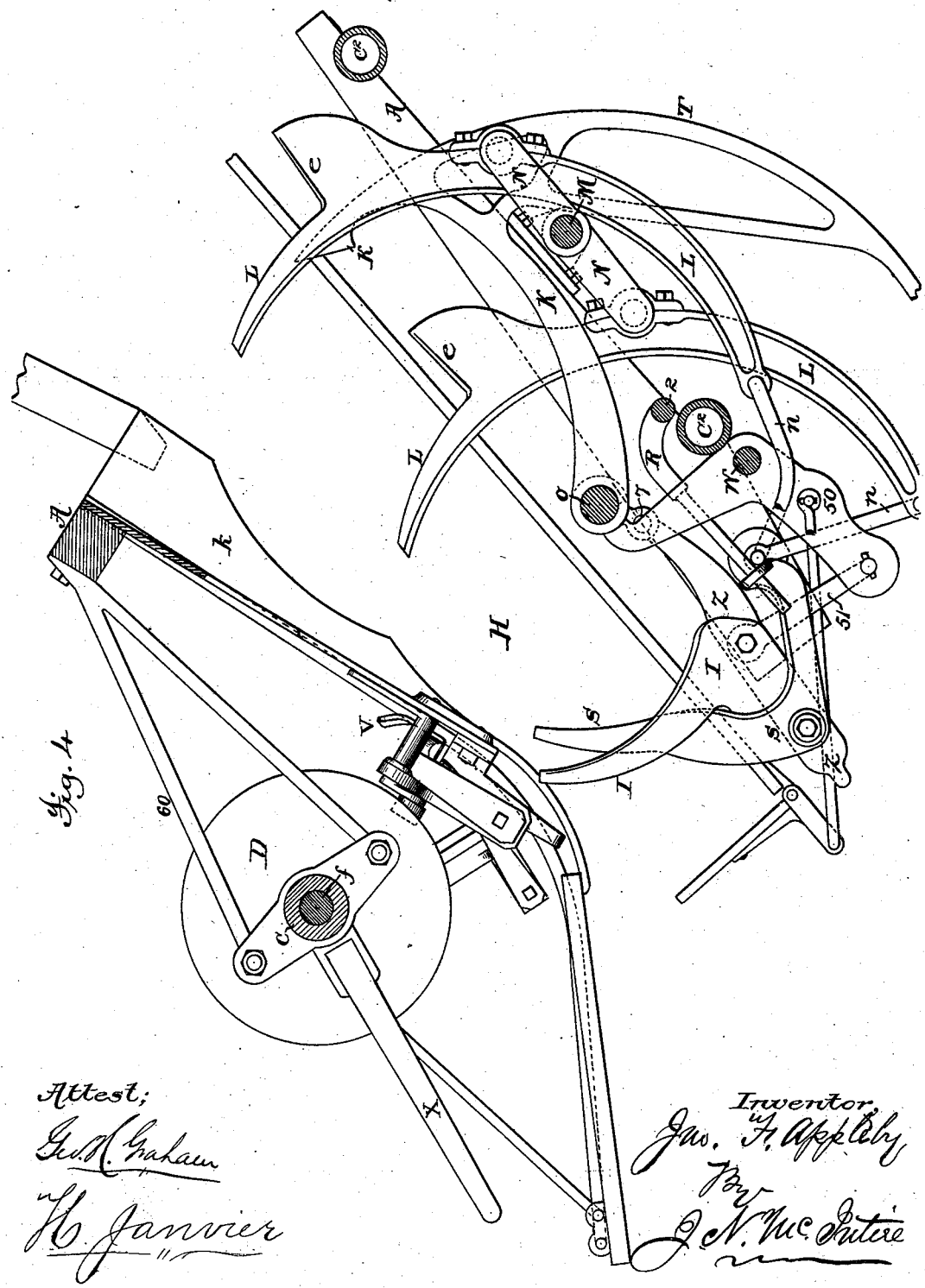

Figure 1 is a partial top view of my improved self-binder. Fig. 2 is a front elevation of the same. Fig. 3 is a partial top view, showing more particularly the tying and sheaf-discharging devices. Fig. 4 is a sectional view on the line *x x*, Fig. 1, with the moving parts in certain relative positions. Fig. 5 is a similar view, showing the moving parts in a different relative position from that seen in Fig. 4.

In the several figures the same part will of course be found designated by the same reference-letter.

The shaft M, which corresponds with the shaft similarly lettered in the patent to which I have hereinbefore alluded, is provided (as in the said patent) with a sprocket-wheel, *b*, through the medium of which and a drive-chain engaging therewith and banded to a wheel on a driving-shaft of the harvester the necessary power for operating all the moving parts of the binder is derived.

Instead of having the packing-arms L L, which operate to pack the grain in the receiver or receptacle H, driven one from the shaft M and the other by a drive-chain from the main driving-shaft, as in the case of the machine shown in my said patent, (and as was necessary in an organization precisely such as shown in said patent,) I now provide the shaft M with two cranks, N N, as shown in Figs. 1, 4, and 5, which are set opposite to each other in their circles of motion, and which drive the two packing-arms L L, as clearly illustrated. By this change from the organization of the machine shown in my said patent I am enabled to simplify the construction of the binder and at the same time render its operations more direct and economical of the driving-power.

The cord-needle and compressor arm K, it will be observed, is arranged so that it swings outside of the shaft M and in a plane intermediate of the two cranks N N, and hence works without interference with any of these three parts of the machine.

The guard T of the needle and compressor arm is attached to it in such a manner, as clearly shown, that said guard can pass down to one side of it and over that part of the shaft M which lies between and connects the two cranks N N, as best seen in Fig. 4.

The packing-arms are combined at their lower ends or heels with arms *n n*, in the manner shown in my said patent, but are in the present case formed or provided at their upper edges, and not far from their front ends, with upwardly-projecting shoulders *e e*, as shown, which operate to force forward and carry downward into the gavel-receptacle the incoming grain, that would otherwise lodge on the upper side of the needle-arm or be impeded in its descent into the said receptacle by said needle-arm, which stands higher than the compressing-faces of the packers L L. These shouldered portions or projections e e of the packers L L, it will be seen, are curved on their upper and rearmost edges, and by reason of this shape and the proper motion given to the packers the said projections e e are rendered capable of receding through the slots of the floor of the gavel-receptacle without dragging through or crowding into said slots any of the grain. The packing-arms L L, being driven directly from the continuously-revolving shaft M, are of course always in motion. It is not necessary that they should be; but, since they perform no labor during the operation of securing the band around the bundle, little or no power is expended practically in the production of such continuous motion by them, and, as before explained, great simplicity and economy of construction follow from their direct connection with the continuously-moving cranks N N.

As in the machine shown in my said patent, the necessary motions of the intermittingly-moving parts of the binder are derived from a drive-wheel, which is periodically rotated once on its axis by power from the continuously-revolving shaft M, transmitted through the medium of devices substantially similar to those shown in my said patent; but the method and means I employ in the present case for effecting the tripping of the lever-stop P by the pressure of the compressed grain in the gavel-receptacle differ essentially from those shown in my said patent. I need not, however, here describe the novel tripping mechanism, because it is made part of the subject-matter of another case filed by me.

In the present case the connecting bar or rod 48 is of an improved construction. Instead of being made as shown in my said patent, it is formed in two parts, $g$ and $h$, the former sliding in the latter, and having on it a spiral spring, $j$, which operates to hold the two parts together endwise and to permit them to be pulled out to lengthen the compound bar formed by them. By this construction of the bar or connecting-rod 48 in two parts, held in their normal relation by the spring, said bar is rendered capable of stretching out, so to speak, in order to permit the fingers I I to yield and descend in the event of any extraordinary strain on them that might otherwise cause the machine to work too hard or damage it, while at the same time it performs its function to move the rock-shaft W in the same manner as if it were a solid bar.

The spring $j$ must of course be stiff enough to prevent a lengthening of the rod 48 when the fingers I I shall be again drawn forward into place.

The movements of the needle-arm K and the means for producing them are substantially the same as shown in my said patent.

Certain matter shown in Fig. 3 of the drawings and claimed in other cases filed by me is herein disclaimed.

Having now so fully explained my several improvements that those skilled in the art can make and use my invention, what I claim herein as new, and desire to secure by Letters Patent, is—

1. The packing-arms L L, arranged to move alternately in the same direction and in substantially the manner described, in combination with the two cranks N N, having a common axis of motion.

2. A needle-arm, K, arranged to vibrate between the two cranks N N, and having its guard T, spanning the axis of motion of said cranks, as set forth.

3. Packing-arms L L, adapted to work through the floor of the grain-chute in the manner described, and formed or provided with projections e e at their upper edges, adapted to operate in the manner and for the purpose described.

4. A yielding or distensible pitman or connecting-rod, 48, formed of two parts, held together endwise by a spring, as set forth, in combination with the cam and lever for actuating it, and the fingers I I, and intermediate devices, through the medium of which said pitman operates the said fingers, all substantially as set forth.

In witness whereof I have hereunto set my hand and seal this 22d day of June, 1881.

J. F. APPLEBY. [L. S.]

In presence of—
C. M. CASTLE,
R. D. JONES.